United States Patent
Ekl et al.

(10) Patent No.: US 7,561,599 B2
(45) Date of Patent: Jul. 14, 2009

(54) METHOD OF RELIABLE MULTICASTING

(75) Inventors: Randy L. Ekl, Lake Zurich, IL (US); Anthony R. Metke, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 600 days.

(21) Appl. No.: 11/229,957

(22) Filed: Sep. 19, 2005

(65) Prior Publication Data
US 2007/0064718 A1 Mar. 22, 2007

(51) Int. Cl.
*H04J 3/06* (2006.01)
*H04L 12/28* (2006.01)

(52) U.S. Cl. .......... 370/507; 370/390; 370/510
(58) Field of Classification Search .......... 370/312, 370/390, 432, 503, 507, 510, 338, 328, 310.2
See application file for complete search history.

(56) References Cited

U.S. PATENT DOCUMENTS

| | | | | |
|---|---|---|---|---|
| 5,297,143 | A * | 3/1994 | Fridrich et al. | 370/445 |
| 5,940,769 | A * | 8/1999 | Nakajima et al. | 455/509 |
| 6,061,341 | A * | 5/2000 | Andersson et al. | 370/338 |
| 6,128,483 | A * | 10/2000 | Doiron et al. | 455/419 |
| 6,775,279 | B2 * | 8/2004 | Murai et al. | 370/390 |
| 7,046,648 | B2 * | 5/2006 | Zhang et al. | 370/331 |
| 7,095,739 | B2 * | 8/2006 | Mamillapalli et al. | 370/390 |
| 7,171,224 | B2 * | 1/2007 | Sarkkinen et al. | 455/502 |
| 7,327,735 | B2 * | 2/2008 | Robotham et al. | 370/394 |
| 7,362,757 | B2 * | 4/2008 | Griswold et al. | 370/390 |
| 7,385,976 | B2 * | 6/2008 | Gu et al. | 370/389 |
| 2002/0167942 | A1 * | 11/2002 | Fulton | 370/352 |
| 2004/0110499 | A1 * | 6/2004 | Kang et al. | 455/422.1 |
| 2004/0179523 | A1 * | 9/2004 | Maruyama et al. | 370/389 |
| 2005/0058116 | A1 * | 3/2005 | Palin et al. | 370/345 |
| 2005/0111452 | A1 * | 5/2005 | Mamillapalli et al. | 370/390 |
| 2005/0243751 | A1 * | 11/2005 | Yoon et al. | 370/312 |
| 2006/0034202 | A1 * | 2/2006 | Kuure et al. | 370/312 |
| 2006/0034317 | A1 * | 2/2006 | Hong et al. | 370/445 |
| 2006/0168240 | A1 * | 7/2006 | Olshefski | 709/227 |
| 2006/0198325 | A1 * | 9/2006 | Gao et al. | 370/270 |
| 2006/0221946 | A1 * | 10/2006 | Shalev et al. | 370/389 |
| 2008/0281208 | A1 * | 11/2008 | Thurston et al. | 600/477 |

* cited by examiner

*Primary Examiner*—Chi H Pham
*Assistant Examiner*—Warner Wong
(74) *Attorney, Agent, or Firm*—Indira Saladi; Anthony P. Curtis

(57) ABSTRACT

A method for providing reliable multicasting is described. A transmitted multicast packet is received at second devices, each of which in response transmits a first acknowledgement. If a second acknowledgement, which acknowledges the first acknowledgement, is not received within a predetermined time period, the first acknowledgement is retransmitted. If all first acknowledgements are not received within a preset time period, the multicast packet is retransmitted. If the retransmitted multicast packet has been received, at each of the second devices, if the second acknowledgement has not been received the first acknowledgement is retransmitted, while if the second acknowledgement has been received, the retransmitted multicast packet is ignored and no additional first acknowledgement is transmitted.

18 Claims, 10 Drawing Sheets

METHOD OF RELIABLE MULTICASTING

FIELD OF THE INVENTION

The present invention relates generally to communication systems and more specifically to the field of reliable multicasting in a communication system.

BACKGROUND OF THE INVENTION

Multicasting refers to the ability by a single device to send packet data to multiple endpoints (or "stations" in wireless local area network (WLAN) terminology) by the use of a multicast address. A communication system that implements multicasting is referred to as a multicast communication system. In such a system, the endpoints desiring to receive packets for a particular call, send join messages to the system. When packets are sent to the multicast address, each device forwards the packet to each endpoint that is a member of the multicast address. For reliability, each endpoint may then acknowledge receipt of the packet.

A problem that arises in reliable multicast communication systems is that if the multicast group is large, then the number of acknowledgements sent in the communications system may flood the system and is described by a well known ACK implosion effect (as is known in the art). Having a large number of acknowledgements flood the communications system degrades system performance. In such a case, acknowledgements may be lost and if acknowledgements are lost, retransmissions need to occur. If a large number of retransmissions are needed, then system performance is negatively impacted. Thus, it would be desirable to reduce the number of acknowledgements that flood the system.

Accordingly, there is a need for an improved method of reliable multicasting.

BRIEF DESCRIPTION OF THE FIGURES

The present invention is illustrated by way of example and not limitation in the accompanying figures, in which like references indicate similar elements, and in which.

Figure 1:
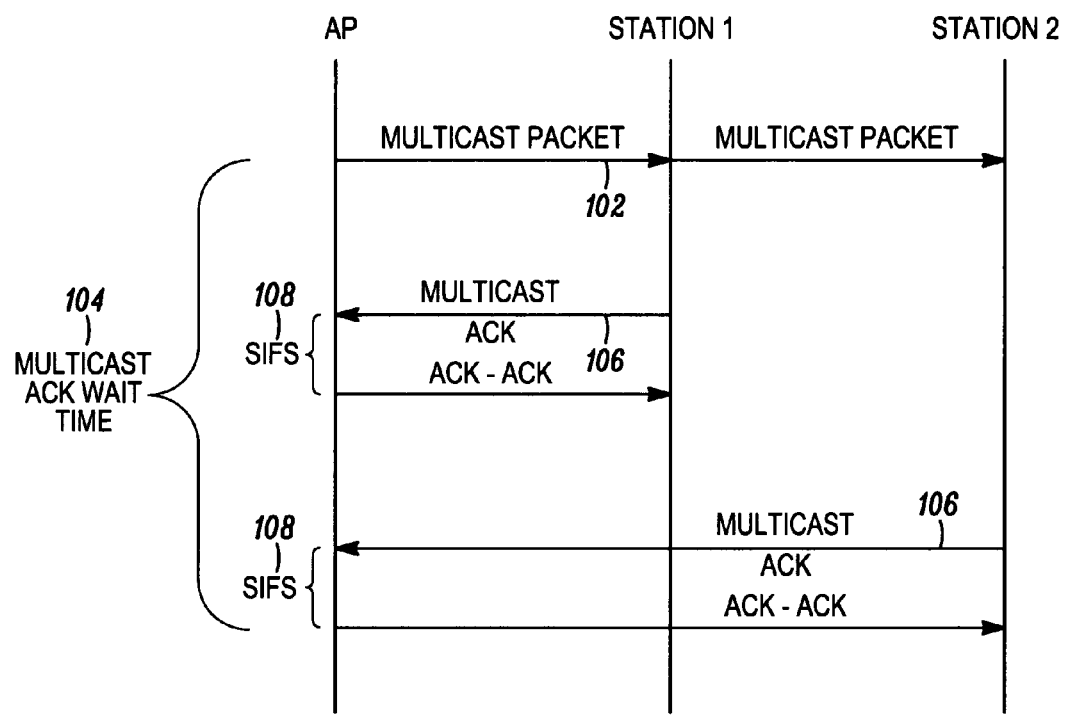
FIG. 1 illustrates a message sequence chart in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

An embodiment of the present invention provides a method for reliable multicasting. An embodiment of the present invention has been described with reference to WLANs. As such, the WLAN adheres to an Institute of Electrical and Electronics Engineers (IEEE) 802 protocol, e.g. IEEE 802.11. In the IEEE 802.11 protocol, a Medium Access Control (MAC) Layer is defined and addressing of packets, including multicast packets, is described. Further, WLAN encompasses both peer-to-peer communications (also referred to as "ad-hoc") and client-server communications (also referred to as "master-slave" or "access point-station"). However, an embodiment of the present invention is envisioned to work in other communication systems. For example, the communication system may be any one of the following: a Worldwide Interoperability for Microwave Access (WiMax) system, an Ethernet communications system, or an Internet Protocol (IP) communications system. For an IP communications system, the multicast packets may adhere to IP multicast protocols, such as Internet Group Management Protocol (IGMP), Protocol Independent Multicast (PIM), Distance Vector Multicast Routing Protocol (DVMRP), Multicast OSPF (MOSPF), Multicast BGP (MBGP), Multicast Source Discovery Protocol (MSDP), and Multicast Listener Discovery (MLD).

In any case, a device, e.g. an access point (AP), in the communication system learns which multicast packets are considered to be reliable and which endpoints, e.g. wireless mobile or portable radio units, (also termed "stations" in WLAN terminology) require reliable service. If reliable service is requested by a station for a specific multicast group, then the AP waits for an acknowledgement (also termed a "first acknowledgment") from the station that received the multicast packet (as used herein a "multicast ACK") and sends an acknowledgment (also termed a "second acknowledgement") acknowledging the multicast ACK (as used herein an "ACK-ACK"). As used herein, reliable service, reliable multicasting, or reliability means that a first acknowledgement and a second acknowledgement are sent in the communications system to indicate that the multicast packet has been delivered.

Specifically, with reference to FIG. 1, an AP transmits a multicast packet 102 to a multicast group comprising stations 1 and 2. The AP waits a time (referred to herein as a "multicast ACK wait time" or "first acknowledgement time") 104 for the stations 1, 2 to send a multicast ACK 106 (also termed a "first acknowledgement"). In one embodiment, the multicast ACK wait time 104 is configurable and/or predetermined. In any case, the multicast ACK 106 is an asynchronous acknowledgement message that is sent unicast from the stations. In one embodiment, asynchronous means that each station arbitrates for the wireless medium, captures the wireless medium, and transmits the multicast ACK 106 as a unicast message to the AP.

In response to receiving the multicast ACK 106 from a station, the AP sends an ACK -ACK (also termed a "second acknowledgement") to the station notifying the station that the AP received the multicast ACK. The station receiving the ACK-ACK knows that the station will not need to acknowledge any retransmitted multicast packets that the station has already acknowledged. For example, referring to FIG. 1, the AP sends an ACK-ACK once it has received a multicast ACK from station 1 acknowledging receipt of the multicast packet 102. In such a manner, station 1 knows that even if it receives multicast packet 102 again, station 1 will not have to acknowledge receiving multicast packet 102 since it has already acknowledged the multicast packet 102 and it has receipt of the acknowledgement by the ACK-ACK from the AP. Thus, wireless bandwidth is not wasted because the station is not required to re-acknowledge multicast packets that it has already acknowledged.

In one embodiment, the ACK-ACK is an atomic message that is transmitted after receiving the multicast ACK. In one embodiment, atomic means that the ACK-ACK is transmitted immediately after receiving the multicast ACK and within a short time, e.g. a Short Interframe Space (SIFS) time 108. Further, since the ACK-ACK is an atomic message, the ACK-ACK does not require the station to arbitrate for the wireless medium. Further, specific examples referring to how an ACK-ACK acknowledgement operates in embodiments of the present invention are described below.

Figure 2:
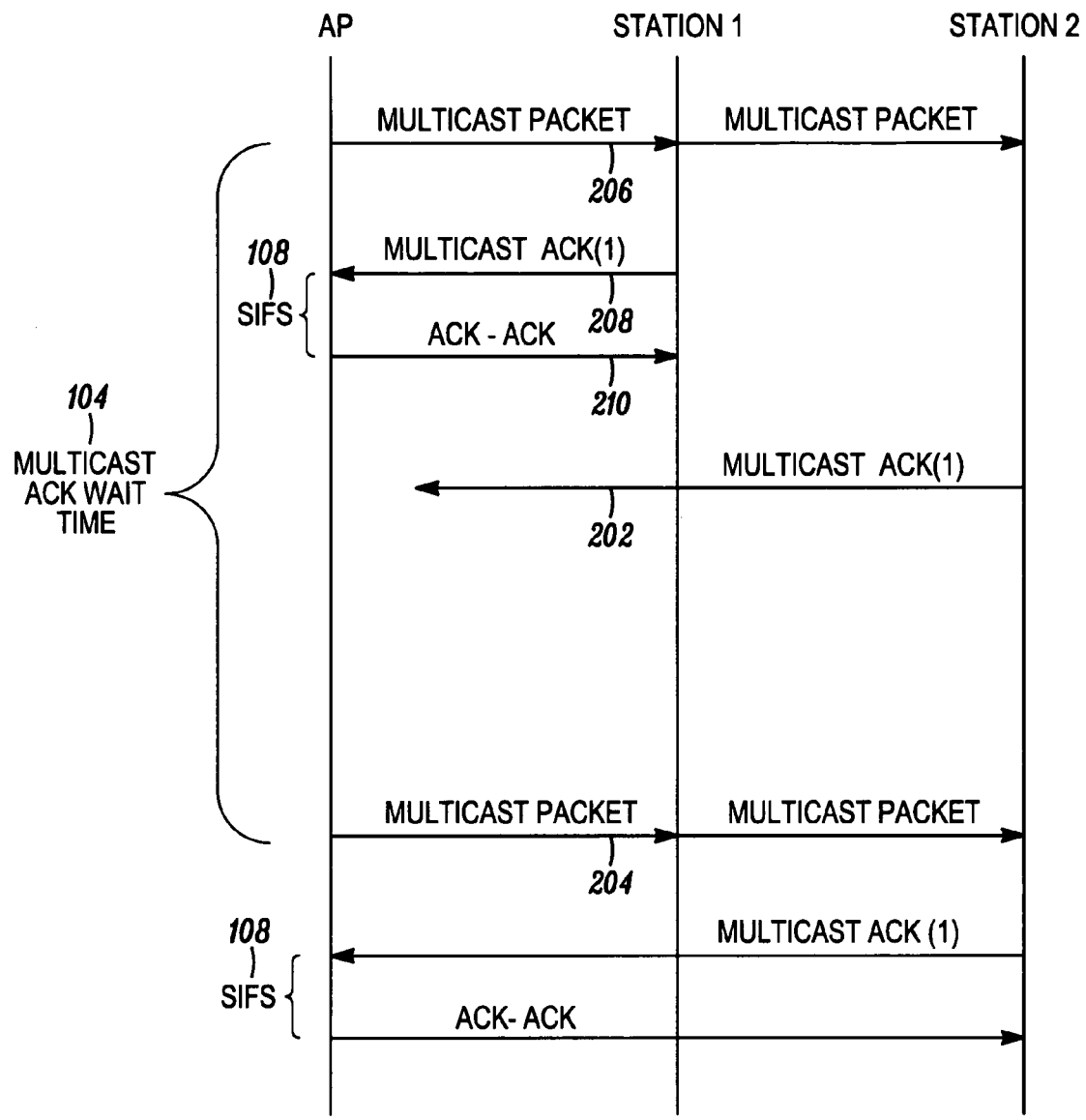
FIG. 2 illustrates a message sequence chart in accordance with an embodiment of the present invention.

Continuing, if all the multicast ACKs, namely a multicast ACK from station 1 and a multicast ACK from station 2, are not received within the multicast ACK wait time 104, then the AP retransmits the multicast packet to the multicast group so that the station(s) that did not receive the multicast packet receive it. For example, referring to FIG. 2, the AP did not receive the multicast ACK 202 from station 2 before expiration of the multicast ACK wait time 104, so the AP retransmits the multicast packet 204 to station 2.

Figure 3:
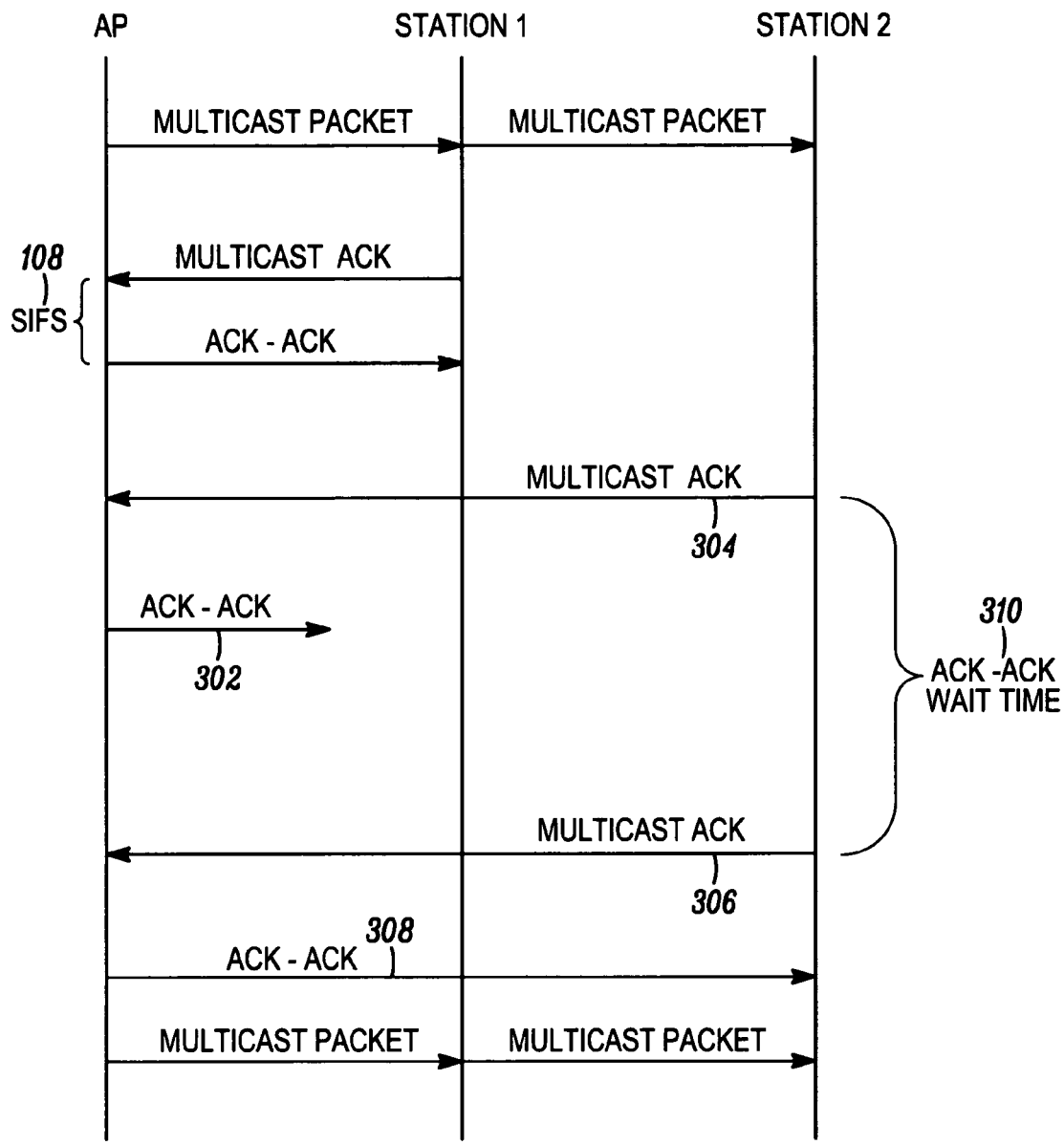
FIG. 3 illustrates a message sequence chart in accordance with an embodiment of the present invention.

Continuing, if an ACK-ACK is not received by a station within a specified time, the station will retransmit the multicast ACK. For example, referring to FIG. 3, station 2 did not receive the ACK-ACK 302 for the multicast ACK 304 sent from station 2. In one embodiment, station 2 maintains a state indicating that it has not received the ACK-ACK 302 and waits a time 310 (referred to herein as an "ACK-ACK wait time" or a "second acknowledgment time"). The ACK-ACK wait time 310 may be configurable and of a short duration. In one embodiment, a station that has not received an ACK-ACK before expiration of the ACK-ACK wait time 310 will retransmit the multicast ACK 306, which triggers the AP to retransmit the ACK-ACK 308.

Figure 4:
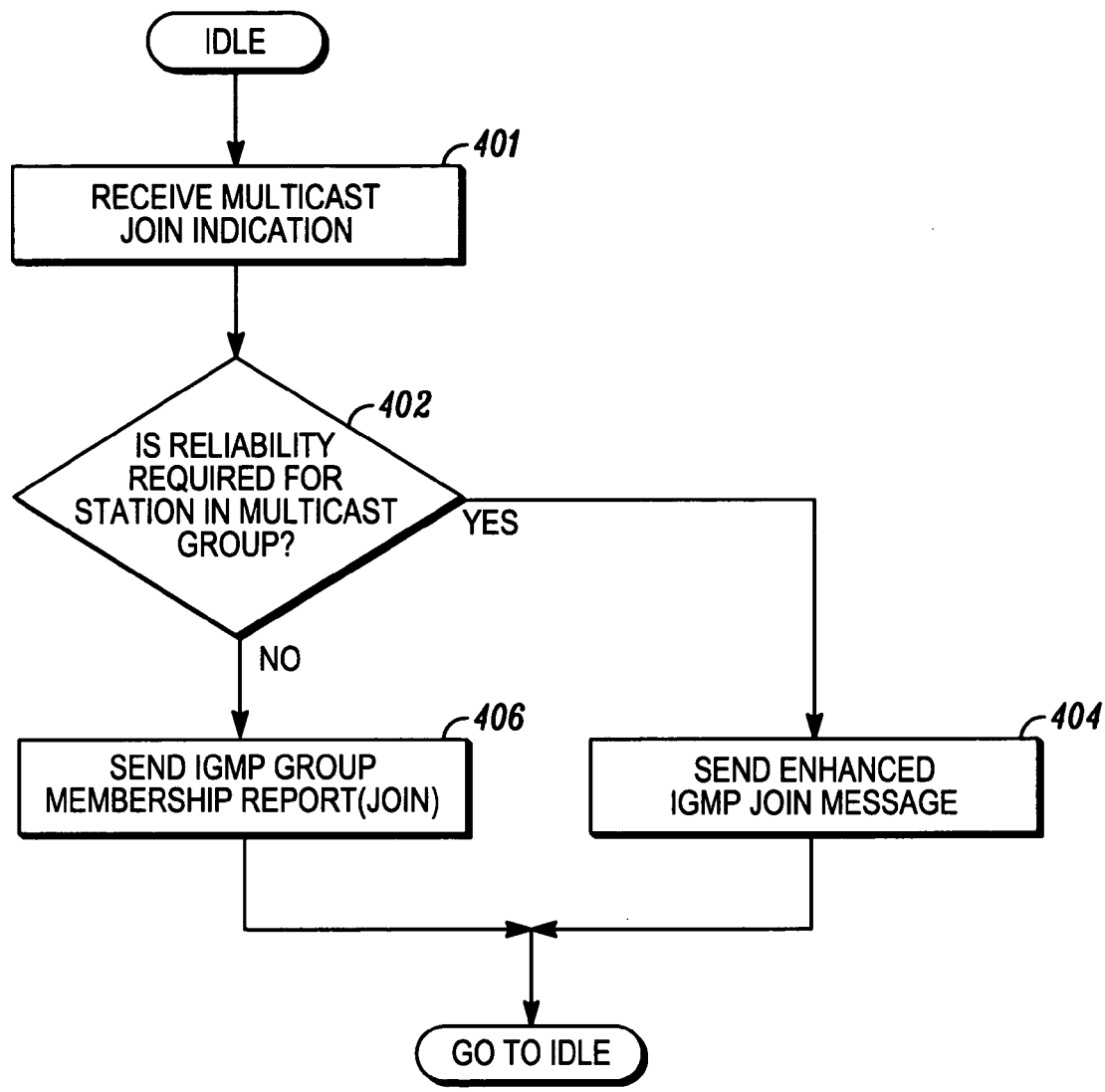
FIG. 4 is a flow diagram illustrating an example method of reliable multicasting from a station's perspective in accordance with an embodiment of the present invention.
Figure 5:
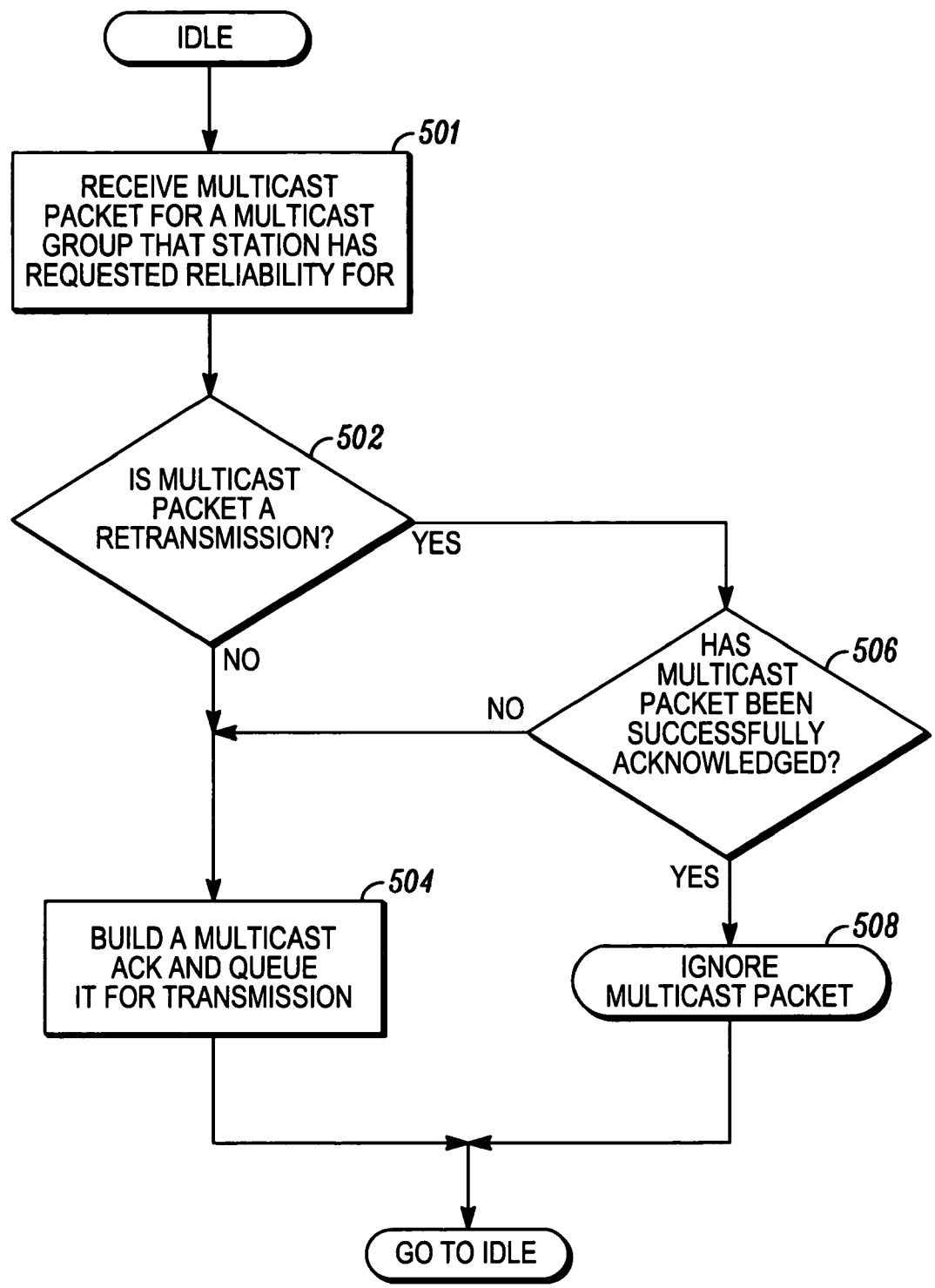
FIG. 5 is a flow diagram illustrating an example method of reliable multicasting from a station's perspective in accordance with an embodiment of the present invention.
Figure 6:
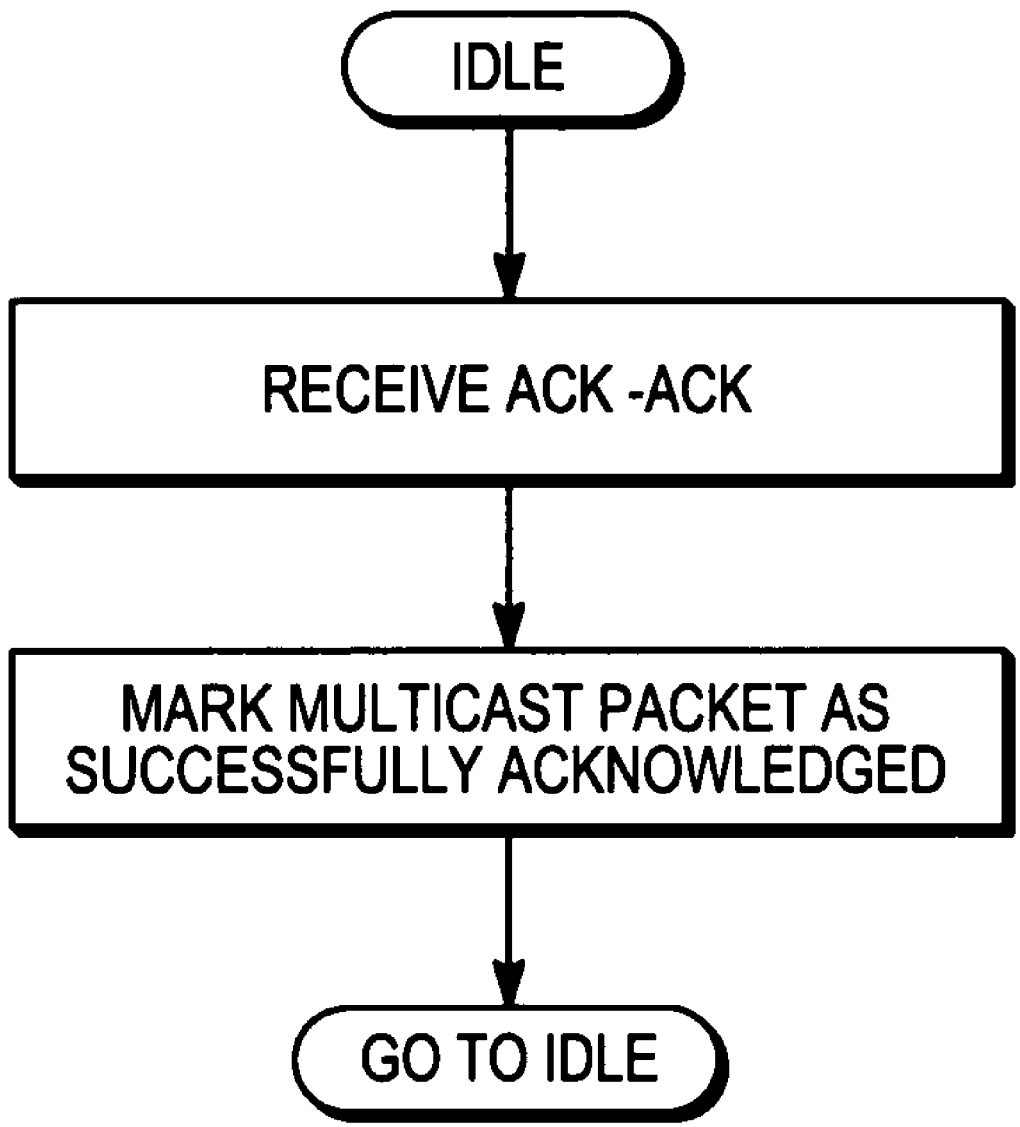
FIG. 6 is a flow diagram illustrating an example method of reliable multicasting from a station's perspective in accordance with an embodiment of the present invention.

FIGS. 4, 5, and 6 are flow charts illustrating a method for reliable multicasting from a station's perspective in accordance with one embodiment of the present invention. A station desiring to join a multicast group, e.g. by receiving an indication from an application running on the station (401), first determines whether reliability is required for the multicast group (step 402). There are a number of mechanisms that the station may use to determine whether it requires reliability. For example, a specific application running on the station may require reliability. As such, the station may keep a list of multicast groups that require reliability. Another example, the station may be configured for reliability, meaning that all multicast groups that the station is engaged in will require reliability.

In any case, if the station has determined that reliability is not required (step 402), then the station sends a join message to an AP to indicate that the station desires to join a multicast group. In one embodiment, the join message adheres to an Internet Group Management Protocol (IGMP) Join message (step 406). As such, the IGMP message may adhere to Internet Engineering Task Force (IETF) Request for Comment (RFC) 3376.

Figure 10:
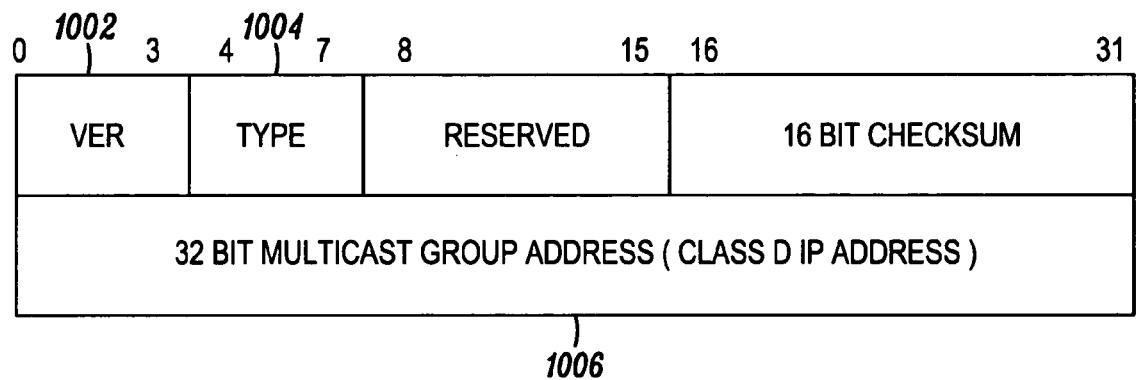
FIG. 10 is an example block diagram of an enhanced IGMP message in accordance with an embodiment of the present invention.

If the station has determined that reliability is required (step 402), then the station sends a join message (step 404) to an attached device indicating that the station desires to join a multicast group and that the station would like reliable service. In one embodiment, the join message indicating reliable service is an enhanced IGMP join message as shown in FIG. 10. As such, the enhanced IGMP join message indicates reliable service by setting a version field 1002 to a value of 2 and a type value to a value of 3. As is known to one of ordinary skill in the art, a different IGMP join message may be used, different values of the fields 1002, 1004 may be used, and different fields 1002, 1004 may be used to indicate reliability and such variations are considered to be equivalent.

Referring to FIG. 5, when a station receives a multicast packet for a multicast group that the station has requested reliable service for (step 501), the station determines whether the multicast packet is a retransmission (step 502). If this is the first time that the station has received the multicast packet, then the multicast packet is not a retransmission and the station builds a multicast ACK that is queued for transmission to the AP (step 504). If this is not the first time that the station has received the multicast packet, namely this packet is a retransmission, then the station determines whether the multicast packet has been successfully acknowledged (step 506). If the station has successfully acknowledged the multicast packet, meaning that the station has sent a multicast ACK to the AP, then the station ignores the multicast packet (step 508). Otherwise, the station builds a multicast ACK that is queued for transmission to the AP (step 504). By sending the multicast ACK, the station is requesting an ACK-ACK from the AP. As mentioned above, in one embodiment, the station waits an ACK-ACK wait time 310 (as mentioned above, also referred to as the "second acknowledgement wait time") for the ACK-ACK from the AP.

In one embodiment, the station determines whether the multicast packet is a retransmission (step 502) by maintaining knowledge of a relationship between the multicast packet, the multicast ACK, and the ACK-ACK. In such an embodiment, the station manages a table that keeps track of multicast packets received. For example, referring to FIG. 2, station 1 maintains a table that has entries for received multicast packets with an entry for receiving multicast packet 206. Thus, when multicast packet 204 is received, station 1 has knowledge that multicast packet 204 is a retransmission of multicast packet 206.

In one embodiment, the station determines whether the multicast packet has been successfully acknowledged (step 506) by keeping track of multicast packets received from the AP with multicast ACKs sent to the AP with ACK-ACKs received from the AP. For example, referring to FIG. 2, station 1 maps receiving multicast packet 206 with the multicast ACK 208 sent for the multicast packet 206. Further, if ACK-ACK 210 is received, then the multicast packet 206 has been successfully acknowledged. If ACK-ACK 210 has not been received, then the multicast packet 206 has not been successfully acknowledged. As understood, "successfully acknowledged" means to receive the ACK-ACK for the sent multicast ACK. In any case, step 506 may be determined by a look-up table in the station or any such equivalent means.

Referring to FIG. 6, when a station receives an ACK-ACK (step 602), the station marks the corresponding multicast packet as successfully acknowledged (604). As mentioned above, referring to FIG. 2, station 1 maps receiving multicast packet 206 with the multicast ACK 208 sent for the multicast packet 206. Further, if ACK-ACK 210 is received, then the multicast packet 206 has been successfully acknowledged. Thus, corresponding means that ACK-ACK 210 relates to multicast packet 206.

Figure 7:
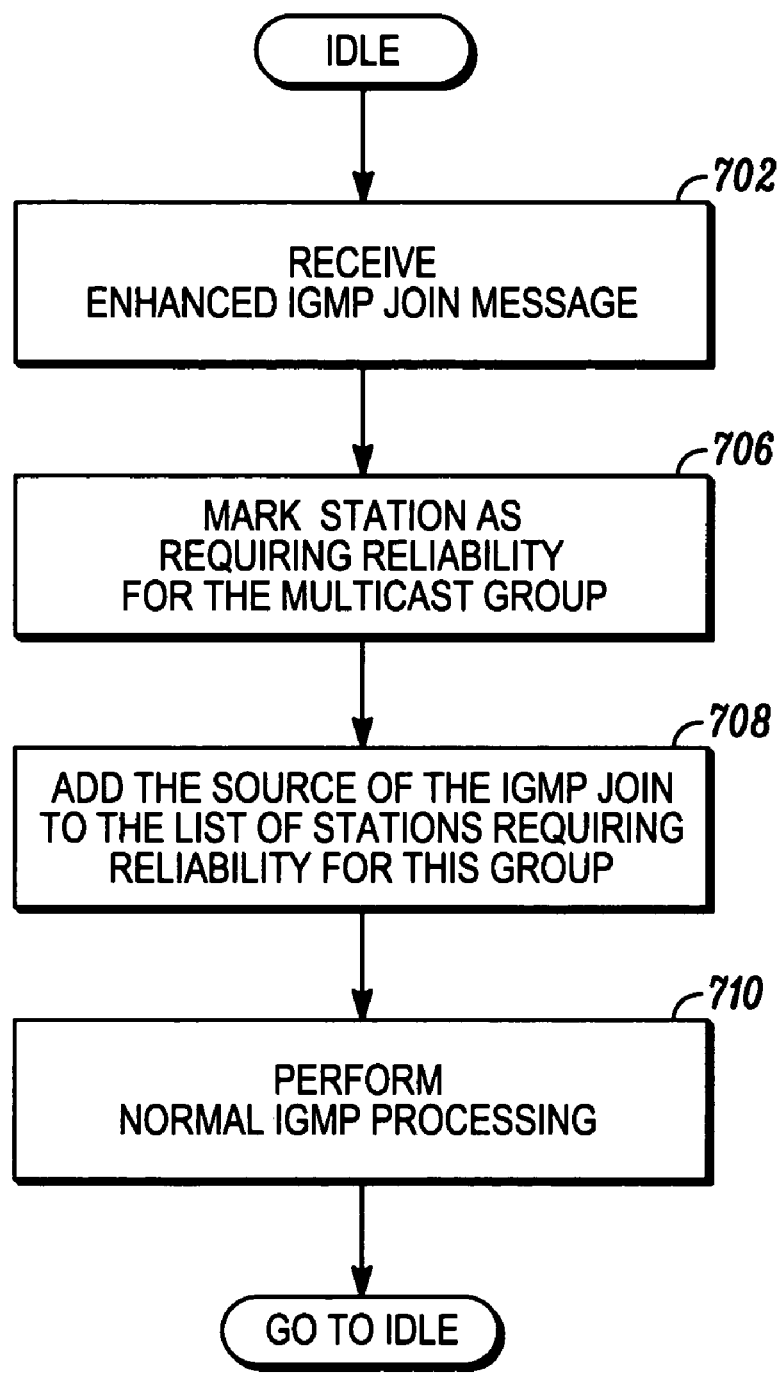
FIG. 7 is a flow diagram illustrating an example method of reliable multicasting from an access point's perspective in accordance with an embodiment of the present invention.
Figure 8:
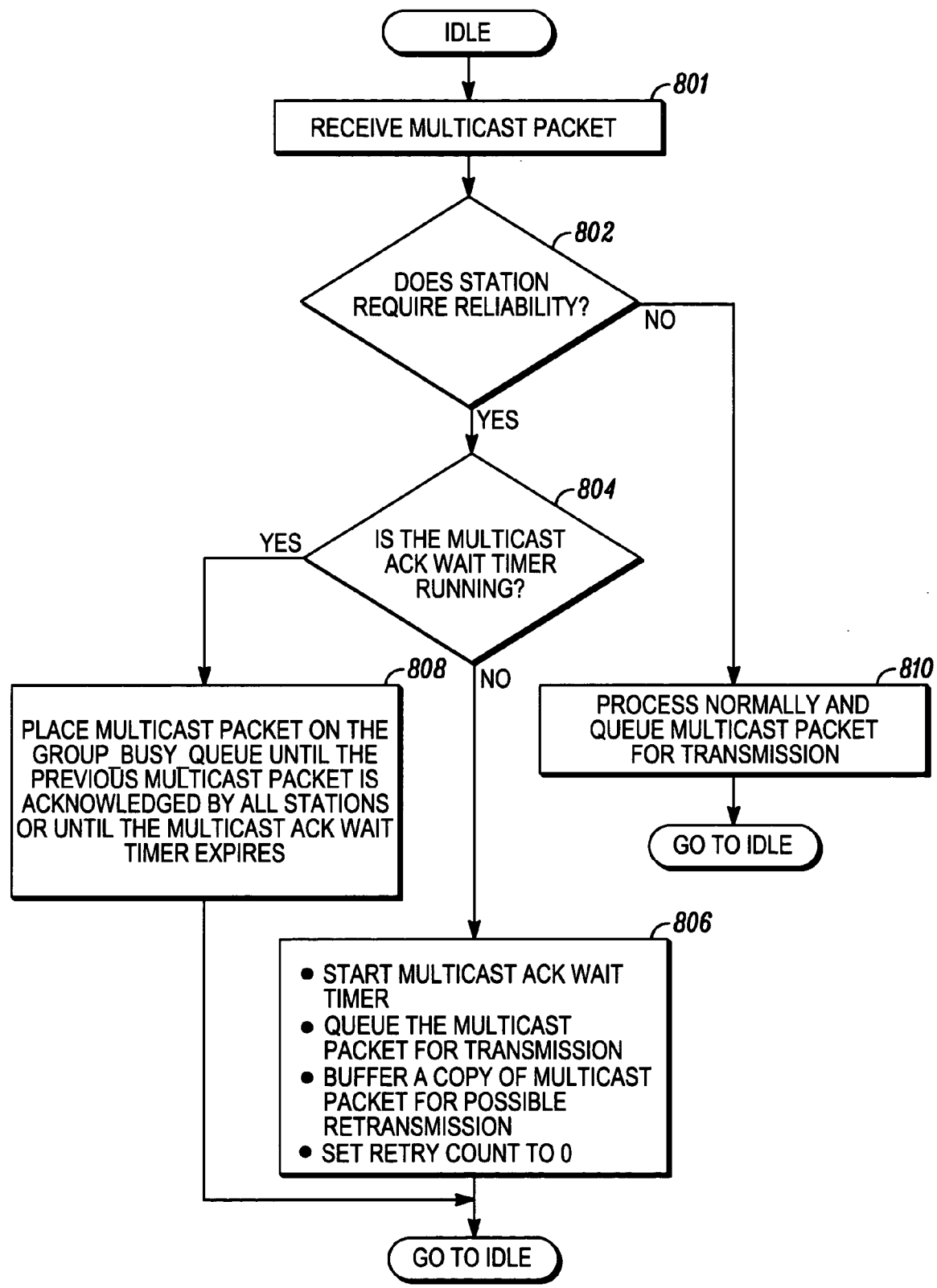
FIG. 8 is a flow diagram illustrating an example method of reliable multicasting from an access point's perspective in accordance with an embodiment of the present invention.
Figure 9:
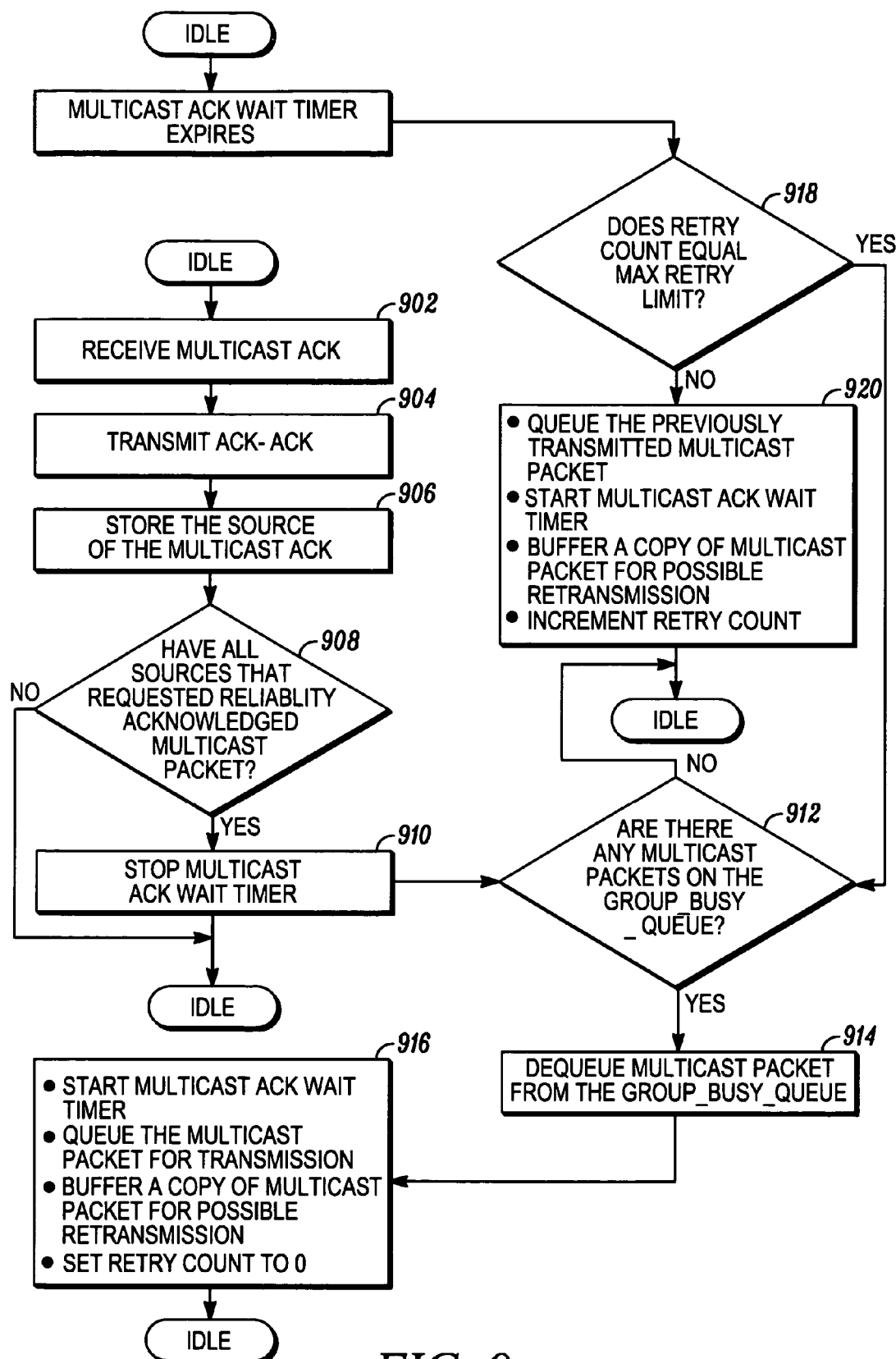
FIG. 9 is a flow diagram illustrating an example method of reliable multicasting from an access point's perspective in accordance with an embodiment of the present invention.

FIGS. 7, 8, and 9 are flow charts illustrating a method for reliable multicasting from an AP's perspective in accordance with one embodiment of the present invention. An AP receives a join message from a station that a station desires to join a multicast group and that the station would like reliability (step 702). In one embodiment, the join message that the AP receives is an enhanced IGMP Join message that is illustrated in FIG. 10. Then, the AP marks the station that is indicated in the join message as requiring reliable service for the indicated group (step 706). In one embodiment, the AP maintains knowledge of stations and groups requiring reliability. In one embodiment, the knowledge is maintained by a list, a table or other such data structure that maps stations and groups with reliability. As such, the AP adds the station to the list of stations and/or groups requiring reliability (step 708). In yet another embodiment, specific multicast group addresses may be preconfigured for requiring reliability.

In any case, the AP performs normal IGMP processing (step 710) as is known to one of ordinary skill in the art. For example, normal IGMP processing means to indicate that a multicast group member exists, e.g. the AP should forward multicast packets for the multicast group.

In one embodiment, the AP may determine that a specific multicast group address requires reliability. In these cases, the AP will require enhanced IGMP messages for reliable service to be performed.

Referring to FIG. 8, the AP receives a multicast packet to be sent to a station (step 801). With reference to the below description, the multicast packet may be destined to more than one station, because the multicast packet may be addressed to a multicast group that is comprised of more than one station. However, the below description is written with reference to the multicast group having one station for ease of illustration. The mention of one station is not meant to be a limitation, since the purpose of a multicast group is to efficiently send data to more than one station simultaneously.

Continuing with FIG. 8, for example, the AP may have received the multicast packet from a router that the AP is attached to where the multicast packet is destined for a station that is located on the WLAN that comprises the AP and the station. Another example, the AP may have received the multicast packet from an application running on the AP where the multicast packet is destined for a station. Another example, the AP may have received the multicast packet from another station in the WLAN. When the AP receives the multicast packet, the AP determines whether the station associated with the multicast group requires reliability (step 802). As mentioned above, the AP maintains knowledge of stations and multicast groups that require reliability, e.g. by maintaining a list of stations and/or groups requiring reliability. As such, at step 802, the AP refers to the list to determine whether the station associated with the multicast group requires reliability.

If the station associated with the multicast group does not require reliability, then the multicast packet is processed normally and queued for transmission to the associated station (step 810). If the station associated with the multicast group does require reliability, then the multicast packet is processed so as to require reliability, namely a multicast ACK is required from the associated station and an ACK-ACK is sent to the associated station.

Continuing with FIG. 8, the AP determines whether a multicast ACK wait timer is running (step 804). In one embodiment, the multicast ACK wait timer is unique to each multicast group. Thus, each multicast group having stations that require reliability has a unique multicast ACK wait timer. In any case, if the multicast ACK wait timer is not running, namely this is the first time that the multicast packet is sent to the station, then a multicast ACK wait timer is started, the multicast packet is queued for transmission to the station, a copy of the multicast packet is buffered for possible retransmission to the station, and a retry count is initialized (step 806). If the multicast ACK wait timer is running, then the AP knows that the multicast packet has already been sent to the station. In one embodiment, the AP places the multicast packet on a group_busy_queue until the previously sent multicast packet is acknowledged by the station, namely the AP receives a multicast ACK from the station, or the multicast ACK wait timer in the AP expires (step 808).

Referring to FIG. 9, the AP receives a multicast ACK from a station (step 902). In response, the AP transmits the ACK-ACK to the station that sent the multicast ACK (step 904). The AP keeps track of the station that sent the multicast ACK so that the AP knows that the multicast packet that the multicast ACK is for has been successfully acknowledged by the station. By having received the multicast ACK, the AP does not accept future multicast ACKs for the sent multicast packet. As such, the number of acknowledgements sent in the WLAN is reduced. In one embodiment, the AP stores the source of the multicast ACK (step 906), e.g. in a table. Further, the AP may set a flag in a table that indicates that the multicast ACK was received from the station.

Then, the AP determines whether all the stations that are a part of the multicast group and that have requested reliability have acknowledged the multicast packet (step 908). As mentioned above, the AP maintains knowledge of stations and multicast groups that require reliability, e.g. by maintaining a list of stations and/or groups requiring reliability. As such, at step 908, the AP refers to the list to determine whether all the stations that are a part of the multicast group and that have requested reliability have acknowledged the multicast packet. If all the stations that are a part of the multicast group and that have requested reliability have acknowledged the multicast packet, then the multicast ACK wait timer is stopped (step 910) and the AP determines whether there are any multicast packets on the group_busy_queue (step 912).

If all the stations that are a part of the multicast group and that have requested reliability have not acknowledged the multicast packet (step 908), then the AP waits for multicast ACKs from the stations that have not acknowledged the multicast packet.

In the meantime, if the multicast ACK wait timer expires, then the AP determines whether the AP tried to send the multicast packet a number of times less than or equal to a retry count (step 918). If the retry count has not been exceeded, the AP retransmits the multicast packet (step 920). In one embodiment, the AP retransmits the multicast packet by queuing the previously transmitted multicast packet, starting the multicast ACK wait timer, buffering a copy of the multicast packet for possible retransmission, and incrementing the retry count.

If the AP determines that the retry count has been exceeded, then the AP determines whether there are any multicast packets on the group_busy_queue (step 912). If there are not multicast packets on the group_busy_queue, then the AP enters the idle state. If there are multicast packets on the group_busy_queue, then the AP dequeues a multicast packet from the group_busy_queue (step 914). Then a multicast ACK wait timer is started, the multicast packet is queued for transmission to the station, a copy of the multicast packet is buffered for possible retransmission to the station, and a retry count is initialized (step 916).

As used above, in one embodiment, the multicast ACK is an applications layer message that has a MAC header, an IP header, an UDP header, a version field, a multicast group field, and a sequence number field. In such an embodiment, the MAC header includes a MAC address of the AP. As such, the MAC address is the AP's BSSID. In such an embodiment, the IP header includes an IP address of the AP. In such an embodiment, the multicast group field describes the multicast group address for the multicast ACK message. In such an embodiment, the sequence number field describes the multicast packet that is being acknowledged.

As used above, in one embodiment, the ACK-ACK is an applications layer message that has a MAC header, an IP header, an UDP header, a version field, a multicast group field, and a sequence number field. In such an embodiment, the MAC header includes a MAC address of the station. In such an embodiment, the IP header includes an IP address of the station. In such an embodiment, the multicast group field describes the multicast group address for the multicast ACK message. In such an embodiment, the sequence number field describes the multicast packet that is being acknowledged.

Although embodiments of the present invention have been described with reference to a stop and wait protocol, an embodiment of the present invention is contemplated to work with a sliding window protocol. For example as described above, the station receives a first multicast packet and sends a multicast ACK in response to receiving the first multicast packet. In a sliding window protocol, the station may receive any number of multicast packets which the station sends corresponding multicast ACKs in response to receiving specific multicast packets. For example, the station may receive first and second multicast packets which the station acknowledges by, e.g. the station sending one multicast ACK acknowledging both multicast packets or the station sending two multicast ACKs. In any case, sliding window protocols are considered to be equivalent. As such, the description with reference to the sliding window protocol is for the purpose of illustration and is not meant to be a limitation on the invention.

Although embodiments of the present invention have been described with reference to multicast ACK and ACK-ACK messages, without reference to a specific layer of a communications protocol, an embodiment of the present invention is contemplated to work with an application layer (e.g. layer seven), an IP layer (e.g. layer three), and a MAC layer (e.g. layer two).

A further embodiment of the present invention contemplates a non-modified ACK for the second acknowledgement (e.g. the ACK-ACK) where the ACK-ACK would not contain the multicast group address or sequence number field, since these values may be inferred by the fact that the second acknowledgement is transmitted immediately after the first acknowledgement.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for providing reliable multicasting comprising:
    transmitting a multicast packet to a multicast group containing a plurality of reliability stations;
    receiving the multicast packet at the reliability stations;
    transmitting a first acknowledgement from each reliability station in response to the reliability station receiving the multicast packet;
    transmitting a second acknowledgement to each reliability station from which a first acknowledgement has been received;
    determining whether first acknowledgements from all of the reliability stations have been received within a first wait time from transmission of the multicast packet, and if not, retransmitting the multicast packet;
determining whether the second acknowledgement for each reliability station has been received at the reliability station within a second wait time from transmission of the first acknowledgement from the reliability station, and if not, retransmitting the first acknowledgement from the reliability station; and
if the multicast packet has been retransmitted and received, in response to the retransmission and the determination whether the second acknowledgement has been received, at each reliability station:
if the second acknowledgement has not been received, retransmitting the first acknowledgement, and
if the second acknowledgement has been received, ignoring the retransmission.

2. The method of claim 1 wherein the multicast group contains non-reliability stations from which the first acknowledgement is not transmitted in response to receipt of the multicast packet.

3. The method of claim 2 further comprising determining whether reliability is to be provided for a particular station prior to the particular station joining the multicast group, and
if reliability is not to be provided, the particular station sending a join message indicating that the particular station is one of the non-reliability stations, and
if reliability is to be provided, the particular station sending an enhanced join message indicating that the particular station is one of the reliability stations.

4. The method of claim 2 further comprising:
maintaining, at each station, a list of reliability multicast groups of which the station is a member and for which reliability is to be provided, the reliability multicast groups being specific to the station or to an application running on the station; and
configuring each station such that reliability is provided for the reliability multicast groups.

5. The method of claim 1, further comprising configuring each reliability station such that reliability is provided for all multicast groups of which the reliability station is a member.

6. The method of claim 1 wherein:
the first and second acknowledgements are transmitted over a wireless medium, and
the second acknowledgement to each reliability station is an atomic acknowledgment message that does not require the reliability station to re-arbitrate for the wireless medium.

7. The method of claim 1 wherein different multicast packets are transmitted to different multicast groups, the reliability station is a member of a plurality of the multicast groups, and at least one of: the first wait times for the multicast groups are independent or the second wait times for the multicast groups are independent.

8. The method of claim 1 further comprising each reliability station:
receiving a new multicast packet;
determining whether the new multicast packet is a retransmission of a previously received multicast packet; and
if the new multicast packet is not a retransmission of the previously received multicast packet, transmitting the first acknowledgement without determining whether the second acknowledgement related to the new multicast packet has been received within the second wait time.

9. The method of claim 1 further comprising maintaining storage indicating multicast groups to which each reliability station belongs and whether each of the multicast groups is a reliability multicast group for each reliability station.

10. The method of claim 1 further comprising:
receiving a new multicast packet for the multicast group;
determining whether a third wait time from transmission of the multicast packet has expired;
if the third wait time has not expired, placing the new multicast packet in a queue to be transmitted to the multicast group until the first acknowledgement has been received from all of the reliability stations; and
if the third wait time has expired or the first acknowledgement has been received from all of the reliability stations, transmitting the new multicast packet to the multicast group.

11. The method of claim 10 further comprising, if the first wait time has expired and the first acknowledgement has not been received from all of the reliability stations, continuing to retransmit the multicast packet until a predetermined number of retransmission attempts is exceeded and then transmitting the new multicast packet.

12. The method of claim 1 further comprising if the first acknowledgement from a particular reliability station has been received within the first wait time, the second acknowledgement has been received by the particular reliability station, and the multicast packet has been retransmitted, not expecting or receiving a new first acknowledgement from the particular reliability station in response to the retransmitted multicast packet.

13. A method for reliable multicasting in a wireless local area network (WLAN), wherein the WLAN adheres to an IEEE 802 protocol, wherein the method comprises at a station in the WLAN:
sending an indication to a device in the WLAN that reliability is required for multicast packets of a particular group;
receiving a multicast packet for the particular group;
determining whether the multicast packet is a retransmission:
if not, sending a first acknowledgement for having received the multicast packet, and
if so, determining whether a second acknowledgement, in response to having sent the first acknowledgement in response to a previous reception of the multicast packet, has been received:
if not, resending the first acknowledgement, and
if so, not resending the first acknowledgement; and
determining whether the second acknowledgement has been received within a wait time from sending the first acknowledgement, and, if not, resending the first acknowledgement.

14. The method of claim 13 wherein the indication is an enhanced IGMP join message.

15. The method of claim 13 further comprising maintaining a table at the station indicating whether a particular multicast packet has been received and whether the second acknowledgement has been received for the particular multicast packet.

16. A method for reliable multicasting in a wireless local area network (WLAN), wherein the WLAN adheres to an IEEE 802 protocol, wherein the method comprises at an access point in the WLAN:
sending a multicast packet to a multicast group containing at least one station;
determining whether the multicast packet is a retransmission, and if so:
determining whether a first acknowledgement from a particular station, in response to the particular station receiving the multicast packet, has been received:

if not, expecting the first acknowledgement and sending a second acknowledgement to the particular station in response to having received the first acknowledgement from the particular station, and if so, not expecting the first acknowledgement;

if the multicast packet is not a retransmission, determining whether the first acknowledgement from each station has been received within a first wait time from transmission of the multicast packet and, if not, retransmitting the multicast packet;

receiving a new multicast packet for the multicast group; and determining whether a second wait time from transmission of the multicast packet has expired:

if the second wait time has not expired, placing the new multicast packet in a queue to be transmitted to the multicast group until the first acknowledgement has been received from all of the stations; and if the second wait time has expired or the first acknowledgement has been received from all of the stations, transmitting the new multicast packet to the multicast group.

17. The method of claim 16 further comprising, at the access point, if the first wait time has expired and the first acknowledgement has not been received from all of the reliability stations, continuing to retransmit the multicast packet until a predetermined number of retransmission attempts is exceeded, and then transmitting the new multicast packet.

18. The method of claim 16 wherein the multicast group contains non-reliability stations from which the first acknowledgement in response to receipt of the multicast packet is not expected to be received at the access point.

* * * * *